(12) United States Patent
Miura et al.

(10) Patent No.: US 8,126,216 B2
(45) Date of Patent: Feb. 28, 2012

(54) PERSONAL IDENTIFICATION DEVICE AND METHOD

(75) Inventors: Naoto Miura, Kokubunji (JP); Akio Nagasaka, Kodaira (JP); Takafumi Miyatake, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/159,699

(22) Filed: Jun. 14, 2011

(65) Prior Publication Data

US 2011/0243395 A1    Oct. 6, 2011

Related U.S. Application Data

(63) Continuation of application No. 12/613,812, filed on Nov. 6, 2009, now Pat. No. 7,995,803, which is a continuation of application No. 11/907,421, filed on Oct. 12, 2007, now Pat. No. 7,627,145, which is a continuation of application No. 11/896,664, filed on Sep. 5, 2007, now Pat. No. 7,599,523, which is a continuation of application No. 11/208,534, filed on Aug. 23, 2005, now Pat. No. 7,280,676, which is a continuation of application No. 09/945,670, filed on Sep. 5, 2001, now Pat. No. 6,993,160.

(30) Foreign Application Priority Data

Sep. 6, 2000 (JP) .................................. 2000-274987

(51) Int. Cl.
G06K 9/00 (2006.01)
G06T 1/00 (2006.01)
(52) U.S. Cl. ....................... 382/115; 340/5.53; 340/5.83

(58) Field of Classification Search .......... 382/115–116, 382/124–127, 132, 180–181, 190–195, 199, 382/202, 206, 209, 218–221, 224–228; 340/5.53, 340/5.83
See application file for complete search history.

(56) References Cited

U.S. PATENT DOCUMENTS 4,573,193 A    2/1986 Shuto et al.
(Continued)

FOREIGN PATENT DOCUMENTS

DE    4421237    12/1994
(Continued)

OTHER PUBLICATIONS

Cross, J.M. et al, "Thermographic Imaging of the Subcutaneous Vascular Network of the Back of the Hand for Biometric Identification", IEEE, 1995, pp. 20-35.

*Primary Examiner* — Manav Seth
(74) *Attorney, Agent, or Firm* — Mattingly & Malur, PC

(57) ABSTRACT

A personal identification apparatus includes a finger inlet into which a finger inserted; an interface where the finger is introduced through the finger inlet; a plurality of light sources provided inside the interface to irradiate light to the finger from a plurality of directions; image pick-up units being respectively arranged opposite to the plurality of light sources and respectively capturing an image from light transmitted from the plurality of light sources through the finger; a unit for adjusting when the plurality of light sources transmit light onto the finger; and a unit for extracting blood vessel patterns contained in images captured by the image pick-up units from the light transmitted though the finger and collating each of the extracted blood vessel patterns with a registered blood vessel pattern for personal identification.

4 Claims, 16 Drawing Sheets

U.S. PATENT DOCUMENTS

| | | | |
|---|---|---|---|
| 4,581,760 A | 4/1986 | Schiller et al. | |
| 4,699,149 A | 10/1987 | Rice | |
| 4,915,116 A | 4/1990 | Hasebe et al. | |
| 5,054,098 A | 10/1991 | Lee | |
| 5,067,162 A | 11/1991 | Driscoll et al. | |
| 5,073,949 A | 12/1991 | Takeda et al. | |
| 5,073,950 A | 12/1991 | Colbert et al. | |
| 5,224,174 A | 6/1993 | Schneider et al. | |
| 5,351,303 A | 9/1994 | Willmore | |
| 5,365,600 A | 11/1994 | Nagaishi | |
| 5,483,601 A | 1/1996 | Faulkner | |
| 5,787,185 A | 7/1998 | Clayden | |
| 5,901,238 A | 5/1999 | Matsushita | |
| 5,974,338 A | 10/1999 | Asano et al. | |
| 6,173,068 B1 | 1/2001 | Prokoski | |
| 6,301,375 B1 | 10/2001 | Choi | |
| 6,349,227 B1 | 2/2002 | Numada | |
| 6,813,010 B2 | 11/2004 | Kono et al. | |
| 6,920,236 B2 * | 7/2005 | Prokoski | 382/115 |
| 6,993,160 B2 | 1/2006 | Miura et al. | |
| 7,007,298 B1 | 2/2006 | Shinzaki et al. | |
| 7,720,263 B2 * | 5/2010 | Sato | 382/115 |

FOREIGN PATENT DOCUMENTS

| | | |
|---|---|---|
| EP | 0150697 | 8/1985 |
| EP | 0780780 | 6/1997 |
| EP | 0918300 | 5/1999 |
| JP | 07-021373 | 1/1995 |
| JP | 7-171137 | 7/1995 |
| JP | 08-089501 | 4/1996 |
| JP | 08-161490 | 6/1996 |
| JP | 09-330413 | 12/1997 |
| JP | 10-127609 | 5/1998 |
| JP | 10-295674 | 11/1998 |
| JP | 11-203452 | 7/1999 |
| JP | 11-347015 | 12/1999 |
| JP | 2000-005148 | 1/2000 |
| JP | 2000/30063 | 1/2000 |
| JP | 2001-184507 | 7/2001 |
| JP | 2001-273497 | 10/2001 |
| JP | 2002-032720 | 1/2002 |

* cited by examiner

FIG.16A

| FAR | FRR | | |
|---|---|---|---|
| | CONVENTIONAL METHOD | OUR METHOD | |
| | | GLOBAL MATCHING | GLOBAL AND LOCAL MATCHING |
| 1% | 2.06% | 0.148% | 0.148% |
| 0.1% | 7.67% | 0.738% | 0.738% |
| 0.01% | 15.3% | 1.17% | 1.03% |
| 0.001% | 18.9% | 1.92% | 1.03% |
| 0% | 22.7% | 2.51% | 1.03% |

FIG.16B

| FAR | FRR | | |
|---|---|---|---|
| | CONVENTIONAL METHOD | OUR METHOD | |
| | | GLOBAL MATCHING | GLOBAL AND LOCAL MATCHING |
| 1% | 0% | 0% | 0% |
| 0.1% | 0.16% | 0% | 0% |
| 0.01% | 0.57% | 0% | 0% |
| 0.001% | 0.72% | 0% | 0% |
| 0% | 1.0% | 0% | 0% |

PERSONAL IDENTIFICATION DEVICE AND METHOD

CROSS-REFERENCES

This is a continuation application of U.S. Ser. No. 12/613,812, filed Nov. 6, 2009, which is continuation application of U.S. Ser. No. 11/907,421, filed Oct. 12, 2007 (now U.S. Pat. No. 7,627,145), which is a continuation application of U.S. Ser. No. 11/896,664, filed Sep. 5, 2007 (now U.S. Pat. No. 7,599,523), which is a continuation application of U.S. Ser. No. 11/208,534, filed Aug. 23, 2005 (now U.S. Pat. No. 7,280,676), which is a continuation application of U.S. Ser. No. 09/945,670, filed Sep. 5, 2001, (now U.S. Pat. No. 6,993,160). The entire disclosures of all of the above-identified application are hereby incorporated by reference. This application claims priority to JP 2000-274987, filed Sep. 6, 2000.

BACKGROUND OF THE INVENTION

The present invention relates to a device and a method for identifying a person by utilizing a vein pattern obtained by imaging light transmitted through his or her finger.

Personal identification techniques include methods based on fingerprints, irises, voice, veins on the back of a hand and so forth. A number of companies are already manufacturing and marketing fingerprint-based personal identification devices. These products identify a person by reading his or her fingerprint by having the fingerprint come into contact with a fingerprint sensor, recognizing end points and branching points of the fingerprint, and collating them with characteristic points of registered fingerprints.

JP-A-295674/1998 discloses a personal identification device based on veins on the back of a hand. According to this, the back of a hand is faced toward an image pick-up camera, and the reflection of the light emitted from the camera is used to pick up a blood vessel pattern to identify the person on that basis. The device is designed to prevent the location of the hand to be imaged from fluctuating from one round of identification to another by having the hand grasp a fixed rod-shaped guide.

JP-A-21373/1995 discloses a personal identification device based on finger veins, which, particularly to reduce the loss of luminous energy at the time of image picking up, keeps an optical fiber in close contact with the finger and picks up a finger image.

SUMMARY OF THE INVENTION

The prior art uses methods highly likely to meet psychological resistance from the person to be identified, such as taking the person's fingerprint or projecting a light beam into his or her eye. Either of the above-cited personal identification devices according to the prior art requires part of the person's body to get in contact with the identification device, and this may make the identification devices unsuitable for use in medical care facilities, where sanitation is of particular importance. Furthermore, as they utilize features exposed outside the human body, these devices are susceptible to forgery.

The present invention is intended to architect a security system in environments where non-contact is required, such as a medical care facilities. For this purpose, the invention provides a device and a method for carrying out personal identification by picking up a finger image in a non-contact manner and extracting the vein pattern of the image from this finger image.

The invention further takes note of a new problem that, where a finger image is to be picked up, it is susceptible to rotation or luminance intensity fluctuations and therefore difficult to identify the person with high accuracy. Accordingly, the invention provides a device and a method for carrying out personal identification with high accuracy even though it uses a pattern of finger veins susceptible to rotation or luminance fluctuations.

In order to achieve these objects, a personal identification device according to the invention has a storage for storing vein patterns of registered finger images, an interface equipped with a light source and a camera for picking up transmitted light through fingers, and a means for extracting a vein pattern contained in the picked-up image of transmitted light through the fingers and identifying a person by collating the extracted vein pattern with the vein patterns of registered finger images, wherein the interface has a groove into which fingers are inserted without contact, and the light source and the camera are arranged opposite each other with the groove between them.

The means for personal identification is characterized in that the picked-up finger image is corrected for any rotation on the plane of image pick-up arising when the fingers are inserted into the interface, and the person is identified by extracting a vein pattern contained in the finger image corrected for the rotation.

These and other objects, features and advantages of the present invention will become more apparent in view of the following detailed description of the preferred embodiments in conjunction with accompanying drawings.

BRIEF DESCRIPTION OF THE DRAWINGS

FIG. 16 is a table showing performance comparison between a method according to the invention and another method in terms of the false accept rate (FAR) and the false reject rate (FRR).

DESCRIPTION OF THE PREFERRED EMBODIMENTS

Figure 1:
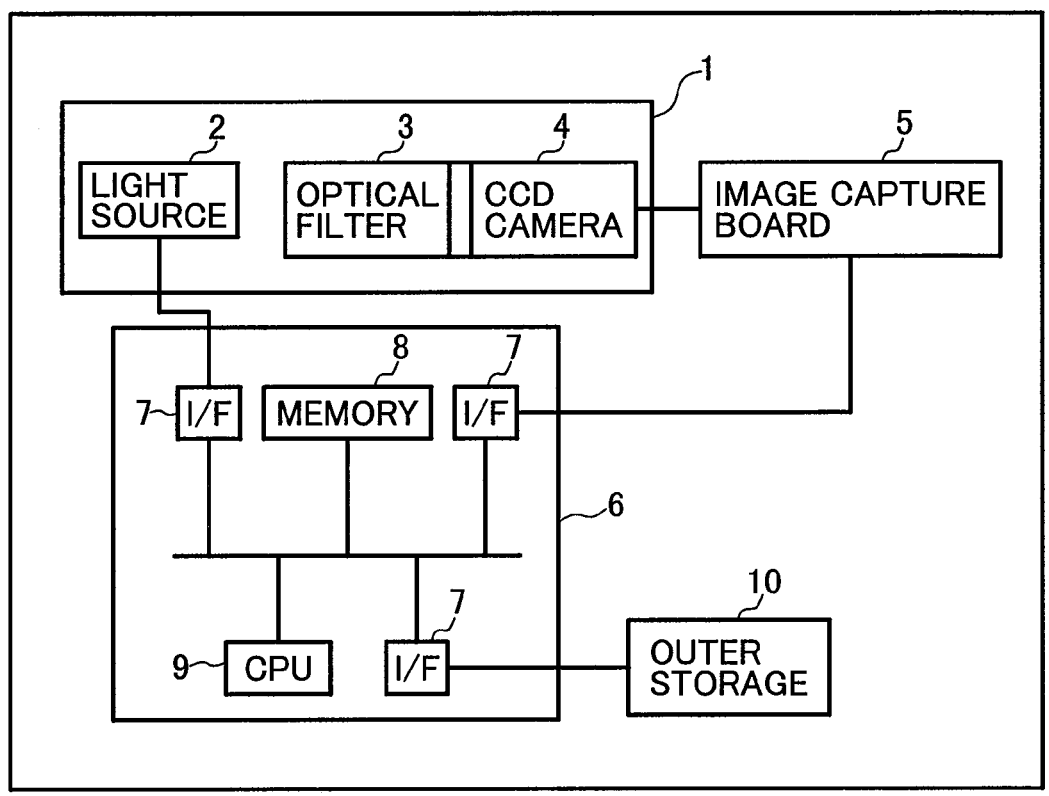
FIG. 1 illustrates an example of system configuration for implementing the present invention.

One embodiment of the present invention will be described in detail below. FIG. 1 is a schematic block diagram of a system configuration for implementing the invention. Within a vein pattern input interface 1, which corresponds to the part into which fingers are to be inserted, there are a light source 2, an optical filter 3 and a CCD camera 4. Insertion of fingers between the light source 2 and the optical filter 3 results in acquisition of a vein pattern. Light transmitted through fingers is picked up by the CCD camera 4 via the optical filter 3. Image signals picked up by the CCD camera 4 are taken into a personal computer (PC) 6 by using an image capture board 5. Within the PC 6, the image signals that have been taken in are stored into a memory 8 via an interface 7. A registered image kept in an outer storage 10 is also stored into the memory 8. Then, in accordance with a program stored in the memory 8, a CPU 9 determines whether or not the taken-in image is identical with the registered image. Incidentally, this program may as well be supplied to the identification device using an outer storage medium. As the storage medium, for example, a floppy disk, hard disk, optical disk, photomagnetic disk, CD-ROM, CD-R, magnetic tape, nonvolatile memory card or ROM can be used.

Figure 2:
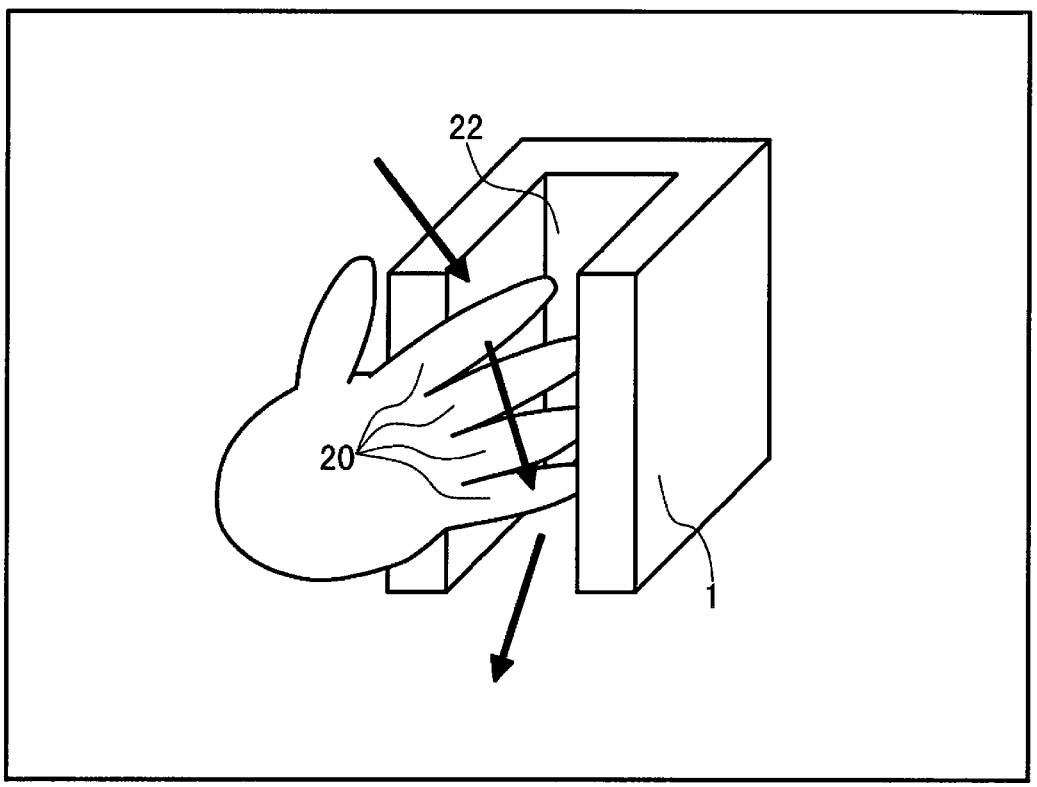
FIG. 2 illustrates an example of configuration of an input interface for acquiring a finger vein image.

FIG. 2 shows an example of structure of the finger vein pattern input interface 1 for acquiring a finger vein pattern image by a non-contact method. The interface has a finger inlet 22, which is a groove-shaped gap. By passing fingers 20 through that part, a vein pattern is acquired. In doing so, there is no need to bring the fingers into contact with the identification device itself. Also, by passing a plurality of fingers through the groove, a vein pattern of a plurality of fingers can be picked up. Furthermore, by swinging down the fingers in an arc track centering on a shoulder, elbow or wrist, it is also possible to pick up a finger image by be consecutively passing the plurality of fingers 20 through the finger inlet 22. Where such a non-contact image pick-up method is adopted, the picked-up finger image rotates relative to the plane of the picked-up image. Therefore, the picked-up finger image inevitably requires rotational correction.

To add, while the groove may have any direction relative to the ground, especially where the groove is provided in a direction vertical to the ground, there is a convenience of use that a patterned image can be acquired by a natural action of the user in which his or her hand is swung following gravity.

Also, the interface structure to let fingers pass through the groove in this manner has an effect of enhancing the accuracy of identification because rotation around the central axis of any finger is thereby made difficult.

Figure 3:
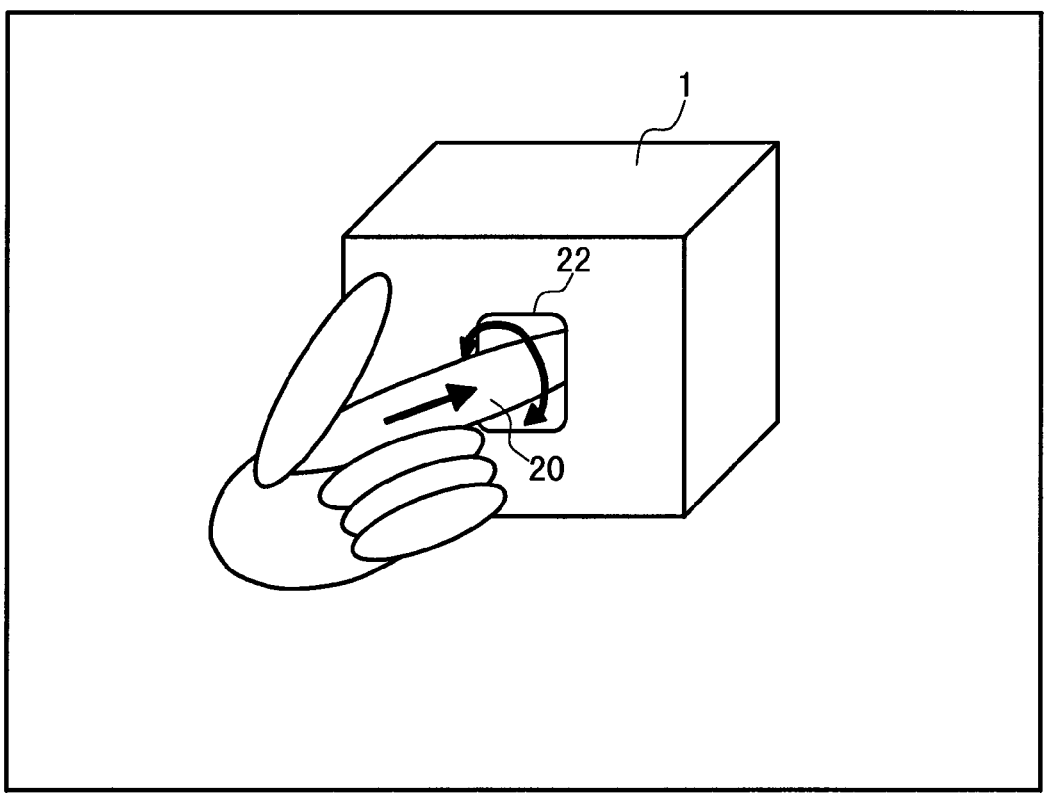
FIG. 3 illustrates another example of configuration of an input interface for acquiring a finger vein image.
Figure 4A:
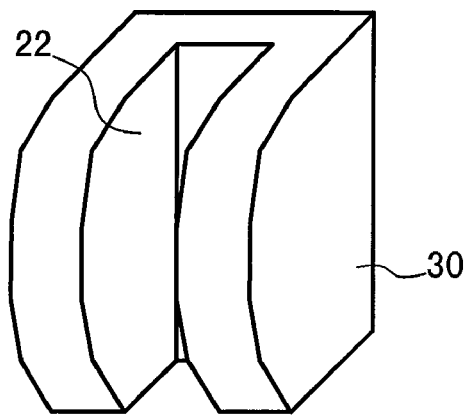
FIG. 4 illustrates an example of finger vein pattern input interface embodying consideration for safety.
Figure 4B:
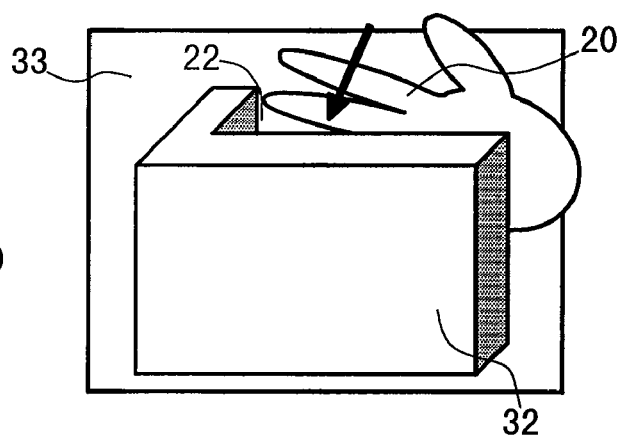
Figure 4C:
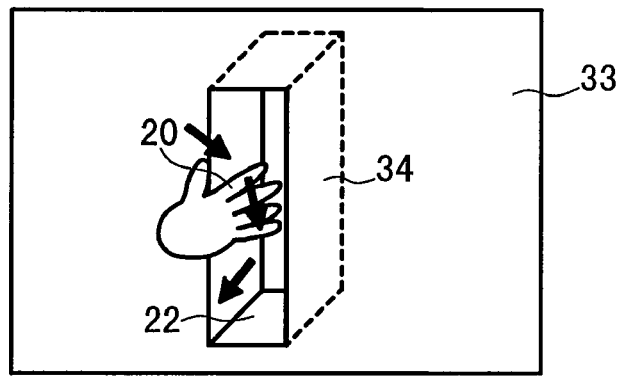
Figure 4D:
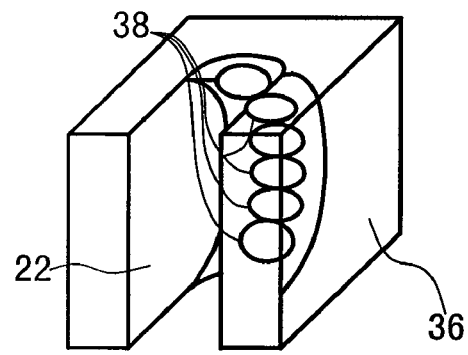

FIG. 3 shows another example of the finger vein pattern input interface 1. This example is an input interface having a hole-shaped finger inlet 22. A finger 20 is inserted into a finger inlet 22, within which one or more each of light sources and imaging devices acquire an image or images of finger veins. In this process, the vein pattern can as well be acquired by rotating the finger in a coaxial direction around the central axis of the finger.

FIG. 4 shows other examples of the non-contact finger vein pattern input interface embodying consideration for safety of the person when being identified and passing by the installation site of the interface. In (a), there is shown a shape in which the corners of the finger vein pattern input interface are chamfered to ensure the safety of any finger, hand, arm and/or the like even if they come into contact. In some installation site, any projection from the identification device could be dangerous. In such a case, arranging the groove laterally as shown in (b) can serve to narrow the width of the projection from the interface or, as shown in (c), the finger inlet can be bored into the wall itself of the installation site. In (c), however, the groove should be wide enough to let the arm swing down through it. Further, to be compatible with swinging down of the arm and imaging of the fingers, the inner end of the finger inlet can be shaped in an arc to match the track of the fingers as shown in (d). These structures make it difficult for fingers to come into contact with the identification device when the arm is swung in an arc. It is also possible to enhance the safety of fingers against contact by covering the surface and finger inlet inside of the identification device with something soft, such as cushions. This figure illustrates the arrangement of cushions 38 along the arc-shaped part. To add, although the groove is cut in the vertical direction and a vein pattern is acquired by having the fingers move in the vertical direction in any of the finger vein pattern input interfaces described above, the groove can be cut, and the fingers moved, in any desired direction depending on the conditions of device installation.

Figure 5:
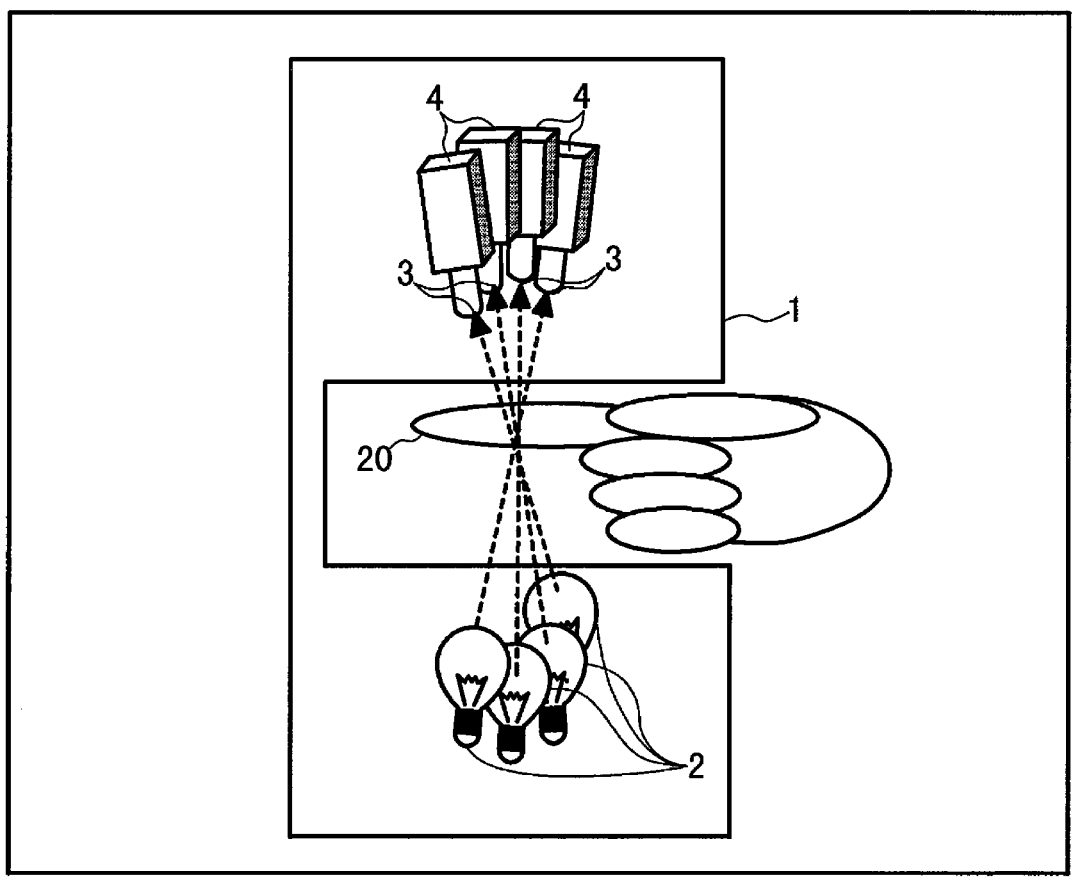
FIG. 5 illustrates an example of arrangement of a light source and a charge coupled device (CCD) camera in an input interface for imaging a vein pattern in many directions.

FIG. 5 shows an example of configuration for picking up vein patterns in many directions within the finger vein pattern input interface with a plurality each of light sources and imaging devices. A plurality each of light sources 2 and CCD cameras 4, each with an optical filter 3, are arranged opposite each other in a coaxial form around the central axis of a finger 20. When the finger 20 is inserted into the interface 1, those imaging devices pick up finger images in many directions. This configuration has an advantage that vein patterns can be picked up in many directions without requiring the rotation of the finger. If interference among the light sources disturbs the picked-up images, the light sources may be operated with time lags for consecutive imaging.

Figure 6:
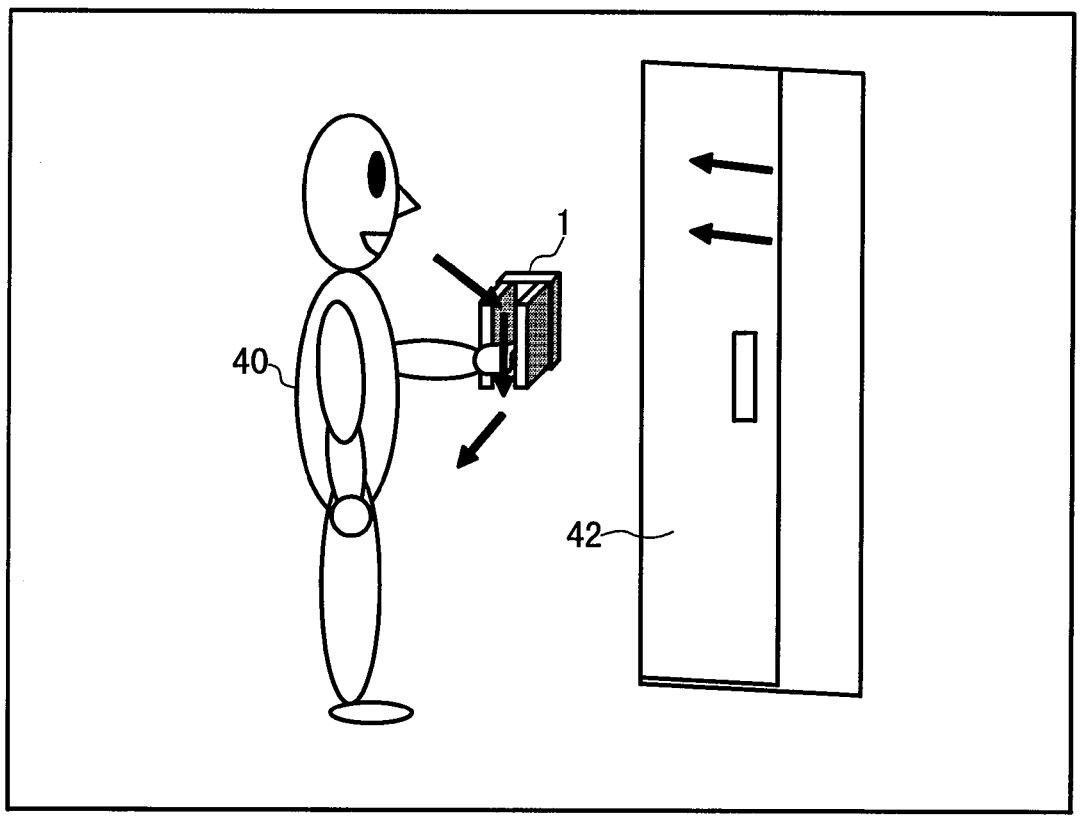
FIG. 6 illustrates an example of system configuration enabling non-contact entrance/exit including personal identification.

FIG. 6 shows an example of system in which the non-contact finger vein pattern input interface is combined with a non-contact automatic door to enable entrance into and exit out of the room, including identification, to be accomplished without contact. The finger vein pattern input interface 1 is installed on a wall beside the automatic door 42, into which the finger 20 is inserted. If the vein pattern of a identification claimant 40 is found identical with a vein pattern registered with the system, the automatic door 42 will automatically open. A major characteristic is that everything from personal identification to the opening/closing of the door then can be accomplished without contact. As the input interface in this case, any of the various configuration shown in FIG. 4 can be used.

Figure 7:
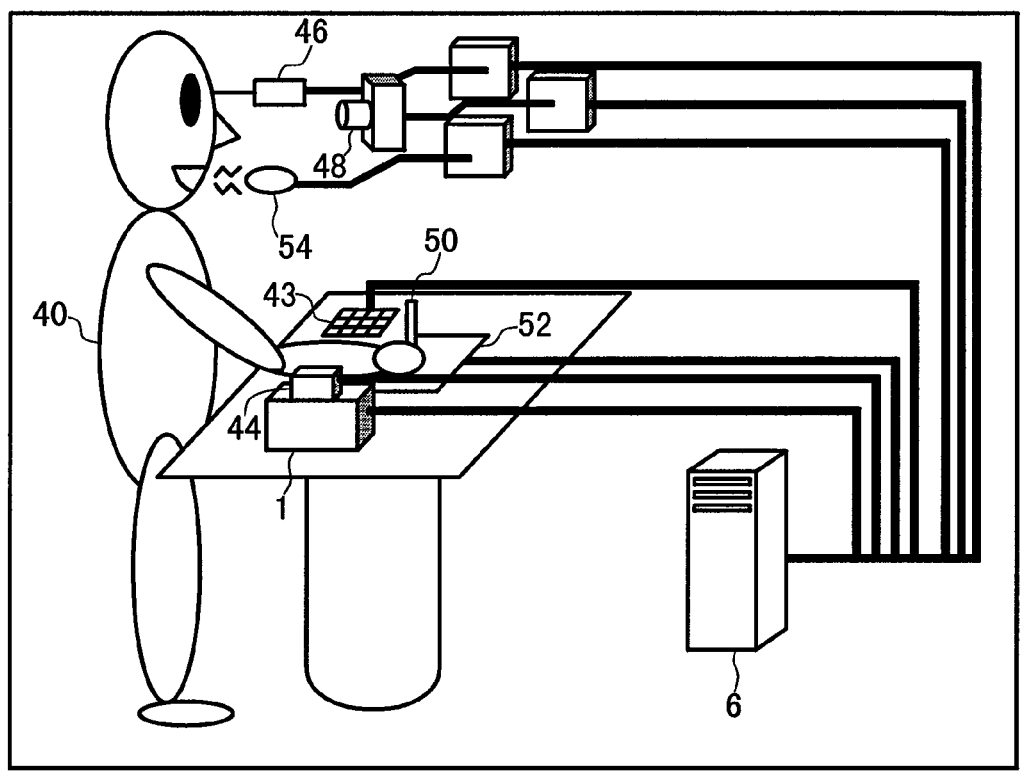
FIG. 7 illustrates an example of system configuration for carrying out personal identification by combining a vein pattern with personal feature information including a personal identification number (PIN), fingerprint, iris, voice, handwriting and face.

FIG. 7 shows another example of personal identification device combining a vein pattern with a plurality of identification keys including fingerprint, iris, voice, handwriting and face. The identification claimant 40 is identified by an identification device installed in a place where he or she is to be identified. Whereas the person's veins are imaged with the input interface 1 to pick up his or her vein pattern, other personal features are inputted by various input interfaces before or after the vein pattern imaging. For instance, the claimant inputs his or her PIN with a PIN input key 43 and inserts a finger into the vein pattern input interface 1 to get identified. To further enhance the accuracy of identification, the person inputs his fingerprint with a fingerprint input interface 44, and an iris image pick-up camera 46 and a face image pick-up camera 48 pick up images of the identification claimant's iris and face, respectively. Then to check his or her handwriting, the person writes characters on a handwriting input tablet 52 with a handwriting input pen 50, and a voice the person utters would be picked up by a microphone 54. These diverse personal features are analyzed by the PC 6 to determine finally whether he or she is to be identified as an authorized person. The way of combination of personal feature information items to be used together with the vein pattern is optional. Although it is obviously unnecessary to use all of them, many such items are used in this example to enhance the accuracy of identification. Also, the fingerprint input device and the vein pattern imaging device can be integrated so that both features can be inputted at the same time by having the person to be identified place his or her finger in a prescribed location only once. This not only saves the trouble of the user but also makes possible more accurate personal identification.

Figure 8:
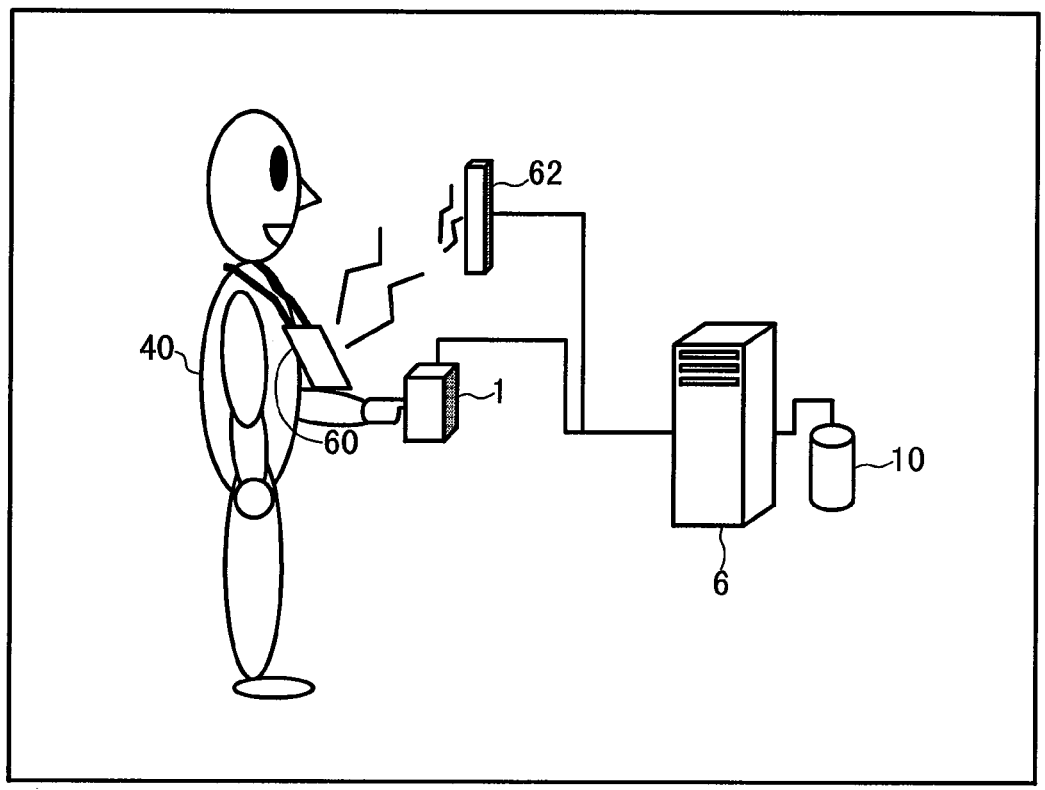
FIG. 8 illustrates an example of system configuration for acquiring a template image of a vein pattern by utilizing an IC card.

FIG. 8 shows an example of system using an IC card to provide the identification device with a PIN and personal feature information. The identification claimant 40 has an IC card 60 on which are recorded his or her PIN, and personal feature information items including the vein pattern, fingerprint, voice, iris, handwriting and face. While this figure illustrates an example in which a non-contact IC card is used, it is also possible to use a contact IC card. Information recorded on an IC card 60 is automatically read into an IC card reader 62 when its bearer approaches the IC card reader 62. While personal feature information is then delivered to the personal identification device, it is also conceivable to acquire personal feature information by delivering then only an identification number for the individual and reading the items of personal feature information matching that number out of the personal feature information stored in the outer storage 10 in advance. In the example of this figure, a vein pattern is provided as personal feature information. After that, a vein pattern is acquired by having the person insert his or her finger into the finger vein pattern input interface 1, and it is collated with the vein pattern read out of the IC card 60 or the outer storage 10. If the patterns match each other, the card bearer is identified to be an authorized person. Although only a combination of a vein pattern and an IC card is shown in this figure, it is also possible to use in combination various items of personal feature information shown in FIG. 7.

The following is a detailed description of a software flow to solve the above-noted problems, to be executed by the above-described hardware, above all by the CPU 9. Incidentally, the software program for implementing this flow may as well be supplied to the identification device by using an outer storage medium.

Figure 9:
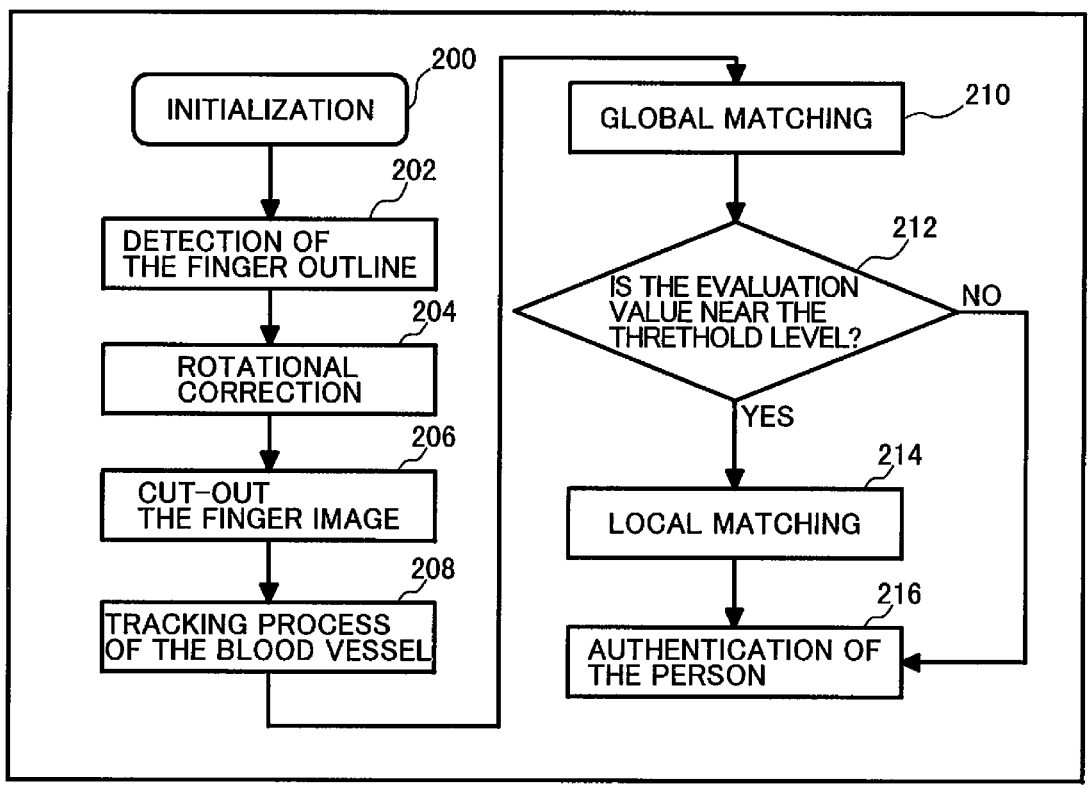
FIG. 9 is a flowchart showing an outline of processing by software to implement the invention.
Figure 10A:
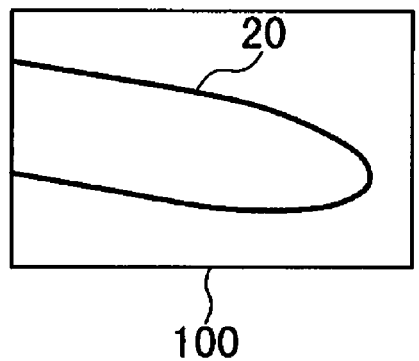
FIG. 10 is an image diagram illustrating a method for tracking the outline of a finger image.
Figure 10B:
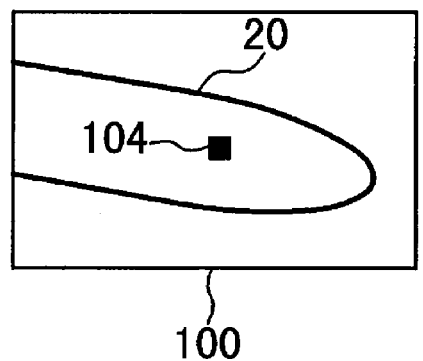
Figure 10C:
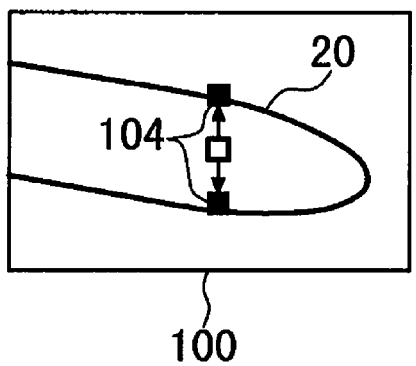
Figure 10D:
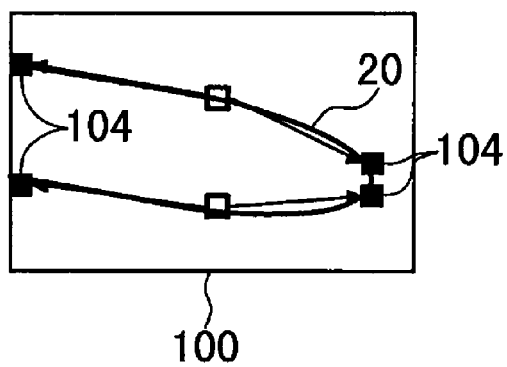

As the storage medium, for example, a floppy disk, hard disk, optical disk, photomagnetic disk, CD-ROM, CD-R, magnetic tape, nonvolatile memory card or ROM can be used. FIG. 9 is a schematic flowchart showing the flow from the time a finger image is taken in until the person is identified. For personal identification using a vein pattern, it is necessary to extract a vein pattern from a finger image that is taken in, and compare it with a registered vein pattern. Therefore, a picked-up finger image should go through a number of steps to be converted into a vein pattern of a form comparable with a registered image. First, after going through initialization (200) in various ways, the finger outline is detected (202) to take out only the finger part in the image. At this point of time, the angle and location in which the finger is imaged can be detected. After carrying out rotational correction (204) to eliminate any inclination of the finger so that it can be recognized correctly in whatever angle and location it may be imaged, the finger image is cut out (206). The image acquired then contains not only the vein pattern but also shades and luminance unevenness which are unnecessary for identification. Therefore, in order to take out only the vein pattern, the blood vessel is tracked (208). By using its result, global vein pattern matching (210) is performed between the registered image and the taken-in finger image, and the correlation between the images is computed as an evaluation value. Whereas the claimant is determined to be the authorized person or someone else according to the level of the evaluation value, if the evaluation value is near the threshold value (212), local matching (214) is carried out by which each image is divided into subregions, each of which is matched with its counterpart to evaluate deviations in matching locations. And final determination is made as to authentication of the person (216).

A detailed description of each individual item in the flow-chart of FIG. 9 will follow.

FIG. 10 illustrates an example of detection of the finger outline; (a) is a schematic diagram of a picked-up image. Here will be described a case in which the finger is imaged in the horizontal direction from the left side of the image and the fingertip is positioned on the right side. First, contrast is adjusted to emphasize the boundary between the finger 20 and the background part. However, there is no need to adjust the contrast of the whole image, but, if for instance the outline of the underside is unclear, it will be sufficient to adjust the contrast of only the under side of the image. This processing emphasizes the edge of the finger. How the edge of the finger 20 in (a) can be made more clear is shown in (b).

Then, the detection of the finger outline is carried out actually. First, a tracking point 104 is positioned at the center of an image 100. From this location, the point is shifted upward and downward separately by one pixel each, and the starting location for detecting the outline part of the finger is determined. As the finger part is shown in the middle of the image, a few pixels each above and below that location all have relatively high intensities. As the point is shifted farther upward and downward, the boundary between the finger part and the background part is eventually reached. At this time, while the intensities of a few pixels toward the inside of the image (finger side) are relatively high, those of a few pixels toward the outside of the image (background side) should be low. Therefore, the difference is calculated by subtracting the sum of the intensities of n outer pixels from the sum of the intensities of the n inner pixels in the current location of the tracking point 104, and the location where the greatest difference value was found within the range of the shift of the tracking point 104 to the upper or lower end of the picture can be determined to be the boundary between the background and the finger.

Arrival of the tracking point 104 shifting upward and downward at boundaries between the finger and the background is shown in (c). Next, the outline of the finger is tracked from this location. In this case, it has to be tracked in two ways, in the rightward direction and in the leftward direction. When it is tracked in the leftward direction, the difference between the sum of the intensities of n outer pixels from the sum of the intensities of the n inner pixels should be calculated at each of three points, to the left, upper left and lower left of the current location, and the point having the greatest difference is chosen as the next location. As the tracking in this way reaches the left end of the image, the locus of the tracking constitutes an outline. The tracking in the rightward direction has to cover the fingertip part. Therefore, the outline tracking on the upper side should include in its range of search a few more pixels to the lower right of the current location and the area straight underneath the current location. Outline tracking in the under side covers a few more pixels upward to the upper right of the current location and the area straight above the current location. This enables even the curve of a high curvature at the fingertip to be detected.

The final result of the tracking of the finger outline by the tracking point 104 is shown in (d). To add, although the foregoing procedure used a simple tracking method because the picked-up image was fixed in form, obviously accuracy can be enhanced by utilizing various other tracking methods used in image processing.

Figure 11A:
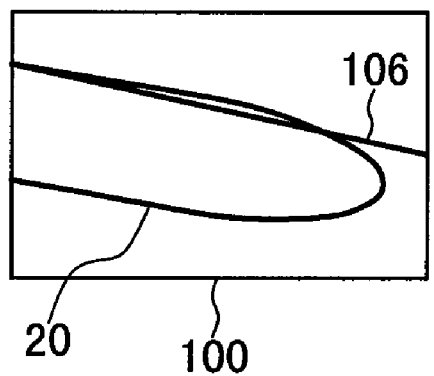
FIG. 11 is an image diagram illustrating a method for performing rotational correction against any inclination of a finger image.
Figure 11B:
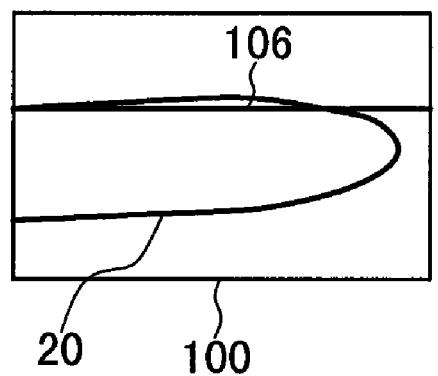

FIG. 11 illustrates one example of rotational correction processing for the finger using finger outline information obtained by the above-described method. An image before rotational correction for the finger is shown in (a). The inclination of the finger at the time of imaging can be found out by checking the shape of its outline. Correction to make the inclination constant in every finger image results in normalization against two-dimensional rotation relative to the imaging plane of the camera.

Whereas the inclination of a finger can be regarded as the angle formed between an approximated straight line of the finger and a horizon, here will be explained as an example a method of rotational correction utilizing the upper outline. The outline of the same line retains the same shape even if the inclination of its insertion varies. Here will be determined an approximated straight line of its outline. Generally, the positional relationship between a curve and its approximated straight line is constant all the time. Therefore, outlines of the same shape differing in inclination can be normalized in inclination by their approximated straight lines. As the approximation can be made more accurate by obtaining the approximated straight line from a curve as close as possible to a straight line, the approximated straight line is determined from the upper outline, which is more nearly straight. More specifically, only the part of the outline between a location 16 pixels from the fingertip toward the root of the finger and a location 128 pixels ahead in the same direction is used. Deliberate avoidance of the fingertip is intended to stay away from a part having a high curvature.

Figure 12:
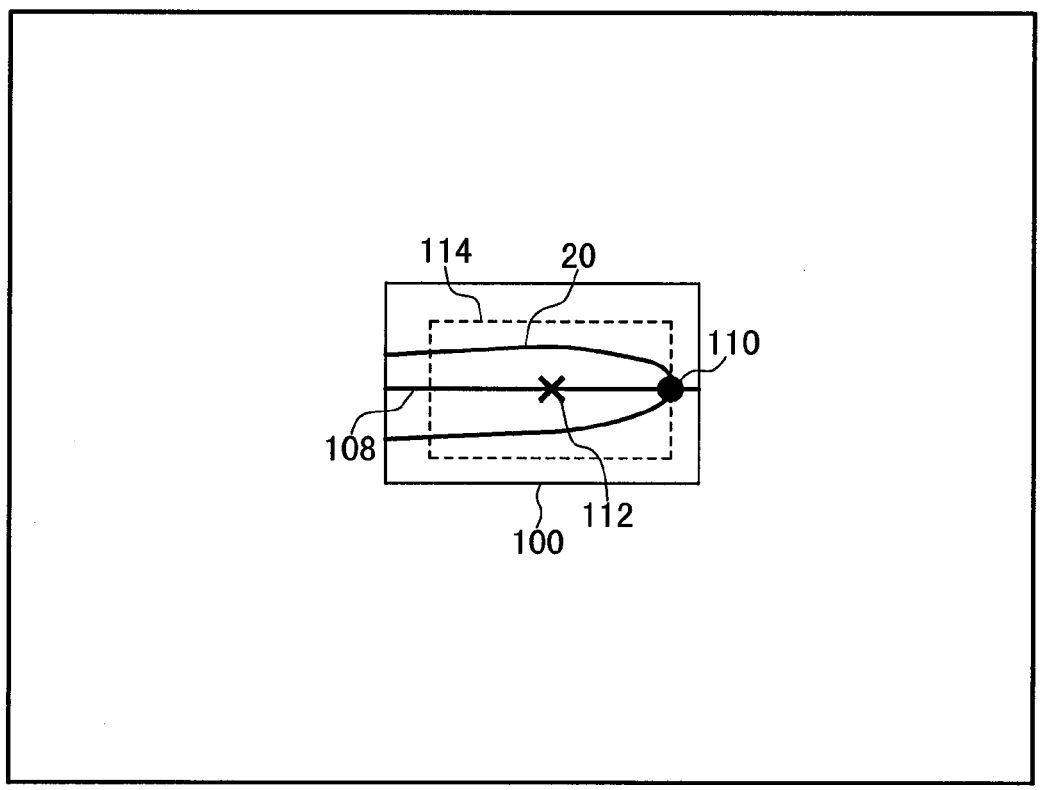
FIG. 12 is an image diagram illustrating a method for normalizing a cut-out part of a finger image.

Next, a few pixels in the outline part to be utilized are picked out at equal intervals, and a straight line 106 approximating the upper outline is calculated by the least-squares method. Finally the whole is rotated so as to make this straight line horizontal relative to the image, where the center of rotation is supposed to be the junction between this straight line and the left edge of the image. Positional normalization will be described later. The result of rotational correction to make the approximated straight line 106 of the upper outline horizontal is shown in (b). FIG. 12 illustrates one example of processing to cut a part required for personal identification out of the finger image having undergone rotational correction. Usually, the locations of a finger image in the horizontal and vertical directions differ every time the finger is imaged. Therefore, in order to facilitate the use of the finger image for matching, it is necessary to normalize the finger location. On the other hand, for the purpose of recognition, it is sufficient for the image to contain a vein pattern, but there is no need to keep other irrelevant parts. Therefore, an image of a smaller size than the original image is cut out of the original. In doing so, matching the cut-out location with the same part of the finger all the time would result in normalization of the location of the finger. Outline information on the finger is used for positioning of the cut-out part. For positioning in the lateral direction, a fingertip 110 obtained from the outline information is utilized and, for instance, a location where the fingertip 110 coincides with the right edge of the cut-out image is selected. Next, for positioning in the vertical direction, the central axis 108 of the finger is determined by using the upper and lower outlines of the finger, and a position in which the central axis 108 passes the center of the cut-out image is selected. Positioning in this manner gives a cut-out image 114. For this cut-out image 114, the same part of the finger will be cut out every time whatever location in the image 100 the finger 20 may be imaged in, and this means normalization of the finger location.

Figure 13:
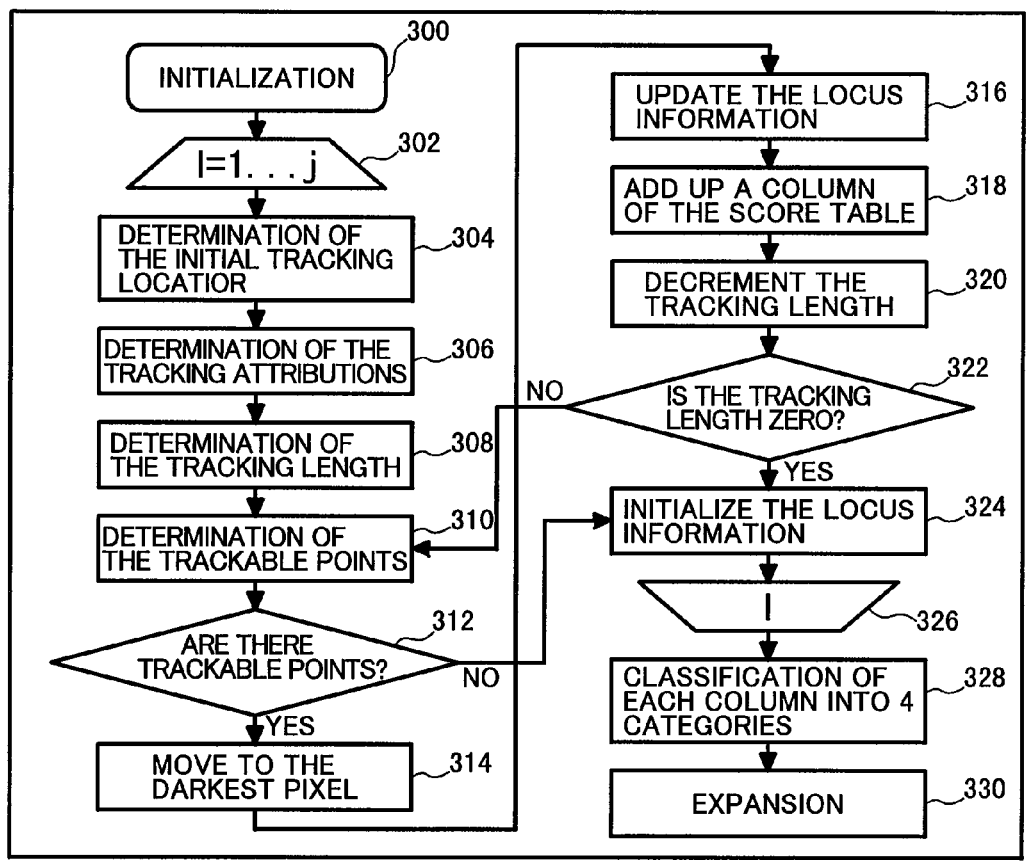
FIG. 13 is a flowchart showing how a vein pattern is taken out of a an finger image.

FIG. 13 is a flowchart showing the tracking process of the blood vessel in the cut-out finger image. In a finger image picked up by a CCD camera does not clearly reveal a vein pattern required for personal identification. The image that is acquired contains much of information unnecessary for identification, such as background noise, irregular shades due to the uneven thickness of the finger bone and muscle and intensity fluctuations. Therefore, in order to use such an image for personal identification, it is necessary to take out only a vein pattern from the image or to emphasize the vein pattern. A finger image results from picking up the light transmitted by the finger. Since the transmitted light is of a wavelength absorbable by hemoglobin in the blood, the blood vessel part takes on a dark luminous intensity. On the other hand, bright light leaks out of joint parts. Therefore, the luminous intensity of the background significantly varies from one part of space to another, so that mere emphasis of edges cannot emphasize the blood vessel alone. However, in a narrowly localized spatial range, the blood vessel part is darker than its surroundings. Therefore, the locus of continuous shifting from a certain location is highly likely to represent a blood vessel. Usually a blood vessel does not exist by itself, but there are a plurality of blood vessels, whose number and lengths cannot be known in advance. In this embodiment of the invention, therefore, many loci of diverse lengths will be picked out in many different locations, and they will be superposed over one another to highlight a single blood vessel pattern in a statistical process.

In accordance with this principle, blood vessels were tracked in the following manner. First, to record the history of blood vessel tracking, a score table of the same size as the image was prepared, and every box in the table was initialized to 0 (300). In a blood vessel tracking loop (302) executed as many (j) times as necessary for highlighting the whole blood vessel pattern, first the initial location of the tracking point for a single round of blood vessel tracking is determined by a random number (304). However, if the initial location is selected in the background, at the fingertip or finger root, or near the finger outline, it would be impossible to correctly track blood vessels. Therefore, the initial location is selected elsewhere by utilizing information on the finger outline.

Further, arrangement of the initial location on a blood vessel would facilitate tracking of blood vessels. Accordingly, a plurality of candidates for the initial location are selected, and the pixel having the darkest luminous intensity among them is determined to be the initial location. However, if the initial location is determined all the time in accordance with this condition, it will become difficult to track blood vessels in a light part. Therefore, pixel having the darkest luminous intensity out of a plurality of candidates for the initial location is not always selected as the initial location, but a pixel having the lightest luminous intensity is selected as the initial location at a certain probability. This probability is determined by a random number. Next, the direction in which it is easier for this tracking point to shift is determined (306). This attribution is used for the determination of a trackable point to be explained afterwards. As one example of method for this determination, the point is determined by a random number to have a property permitting ready shifting rightward or leftward and upward or leftward. Then, the "length" of tracking of the tracking point is determined (308), and at the same time its value is given to the tracking point as its initial value. Tracking is discontinued when tracking has been done for a distance determined by that length. Thus, the duration of tracking is made the length of the tracking point, and the length is exhausted when each pixel is tracked. The tracking is ended when the length is fully exhausted. This length is determined by using a random number.

Then, this tracking point is shifted. At the beginning, a point to which the tracking point can shift next is determined (310). Whereas most of the blood vessels run in the lengthwise direction of the finger, aligning the shifting direction of the tracking point with the running direction of blood vessels results in increased emphasis of the blood vessels. Therefore, by giving a certain tendency to eligible candidates for the destination of next shifting, the shifting tendency of the tracking point is controlled.

As an example of shifting tendency, to facilitate shifting in the right and left longer axis directions at a probability of 50%, three vicinities on the right or left are selected as trackable points and, for 30% out of the remaining 50%, three vicinities above or below are selected as trackable points to facilitate shifting in the shorter axis direction of the finger. For the rest, eight vicinities are selected as trackable points. However, in any case, no shifting away from the locus tracked so far or outside the finger is allowed. Whereas, trackable points are selected in this way, if no trackable point can be found (312), tracking with the current tracking point is ended Then, the tracking point is shifted to the pixel having the darkest luminance intensity out of the trackable points (314). Then, the current location is registered or updated (316) as locus information so that the current tracking point may not track again the locus it has tracked. At this point, the score in the position in the score table corresponding to the coordinates of the pixel is counted up (318). In this case, five points are added, for example. Also, the length, i.e. the tracking length of the tracking point, is counted down by one (320). It is then judged whether or not the tracking point length is zero (322). If it is not, the process returns to the determination of trackable points (310), and the addition of score points and the updating of locus information are repeated. When the length has been wholly exhausted, information on the tracked loci is initialized (324) to complete tracking with the current tracking point. The execution of such a process of blood vessel tracking is repeated many times. Upon completion of this repetition, for pixels tracked a greater number of times, i.e. parts that are more probable to be blood vessels, the scores corresponding to those positions in the score table are higher. Conversely, locations with lower scores are more probable not to be blood vessels. Therefore, vein patterns themselves are apparent in this score table. Therefore, grasping this score table as an image would give an image in which only a vein pattern or patterns are picked out.

In order to render a vein pattern acquired in this way into a form more convenient for matching, columns in the score table as a vein pattern are classified according to the score count. Herein, they are classified into four categories for example (328). First, no blood vessel is supposed to be present in pixel locations with low scores. Pixel locations with high scores are supposed to be highly likely to represent a blood vessel. Pixel locations with medium scores are supposed to be ambiguous regions which may, but are not certain to, represent a blood vessel. Pixels located outside the finger outline are supposed to belong to the background. By matching these four categories with luminous intensities, an image of a vein pattern is acquired.

Finally, in order to fill the blanks of pixels which happened to escape tracking, the blood vessel regions and ambiguous regions were subjected to expansion (330). The expansion was accomplished by checking, with respect to all the pixels present in the image, eight vicinities of pixels in the blood vessel regions and ambiguous regions and, if any non-blood vessel region in which the number of pixels is four or less, converting that non-blood vessel region into an ambiguous region.

Figure 14:
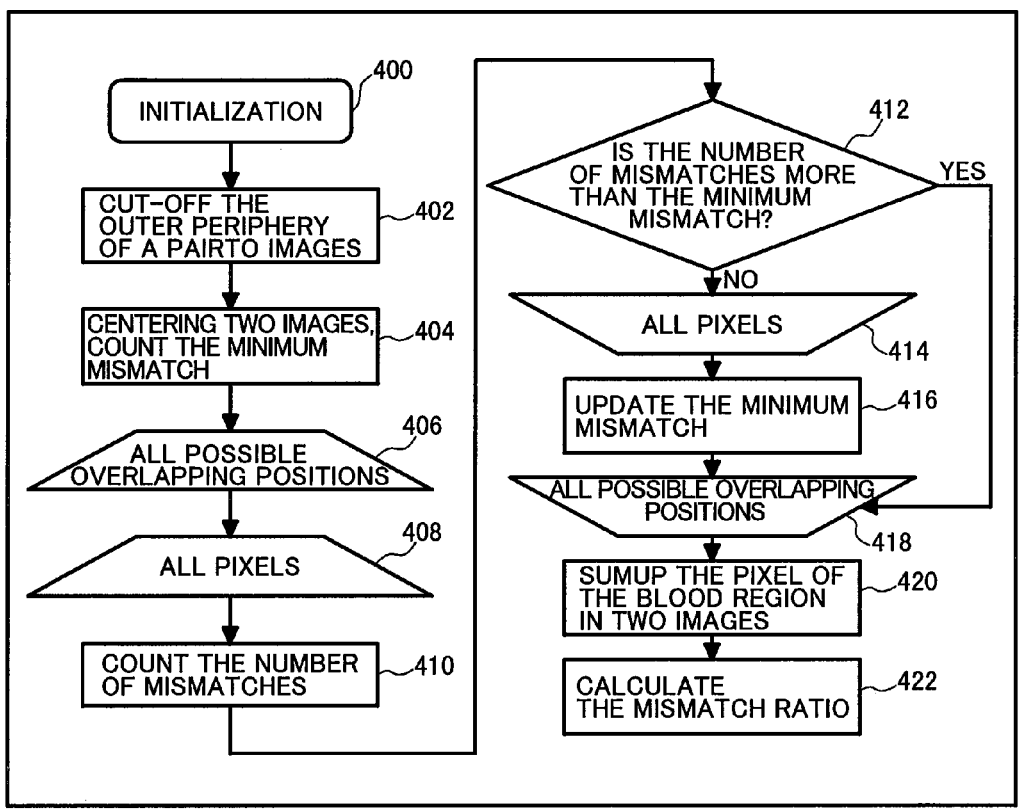
FIG. 14 is a flowchart showing how the ratio of mismatching between two vein patterns is calculated.

By the foregoing procedure, the score table is converted into a vein pattern image and at the same time into a form more convenient for use in matching. FIG. 14 is a flowchart showing one example of technique for judging whether or not a vein pattern, acquired by the above-described method, is identical with a registered vein pattern. As an algorithm for comparing two images, a sequential similarity detection algorithm (SSDA) was adopted. This is a technique, making use of the property of mismatches to increase monotonously, to discontinue calculation at a point having surpassed a certain threshold. At the beginning, initialization (400) is carried out in various aspects. Then, one of the two vein pattern images is reduced in size by cutting out pixels on the circumference of the image (402). Then these two images are superposed one over the other, with their central parts aligned, and the luminous intensities of each pair of superposed pixels are compared (404). Then, if a pixel highly likely to represent a blood vessel is superposed over a pixel which is highly unlikely to do so, these pixels are said to be mismatched. The number of these mismatched pixels is counted for the whole images, though pixels in the larger image having no counterparts in the smaller image are ignored. The number of mismatches at this time is regarded as the initial value of the smallest number of mismatches. Then, the images are shifted one pixel or a few at a time within a range in which no part of the image reduced in size protrudes out of the larger image (n pixels upward, downward, rightward and leftward from the center of the images), and the number of mismatches counted in each shifted location. In this process, while the number of mismatches is counted pixel by pixel in the whole images in their current state of superposition (410), if the current smallest number of mismatches has surpassed even on the way of counting mismatches, the counting is discontinued (412) because no smaller number of mismatches can be obtained. If the current number of mismatches does not surpass the smallest number of mismatches, the smallest number of mismatches in the past is rewritten into the current number of mismatches (416). After the images are superposed over each other in the whole range, the smallest number of mismatches that is finally obtained is the number of mismatches between these two images.

Finally, the ratio of mismatching is calculated from this result. First, the sum of the numbers of pixels highly likely to represent a blood vessel in the two images is calculated (420). For the larger image, however, n pixels in the circumferential region is disregarded. By using its result and the number of mismatches, the ratio of mismatching between the two vein patterns can be calculated (422). Here, the ratio of mismatching is defined to be the quotient of (the number of mismatches)/(the total number of pixels highly likely to represent a blood vessel in the two images). If the two vein patterns are the same, the ratio of mismatching is either zero or very small. However, if the vein patterns are different, the ratio of mismatching can be very high. If this value is smaller than a certain threshold, the identification claimant is judged to be the authorized person or, if it is higher, he or she is judged to be someone else.

Figure 15:
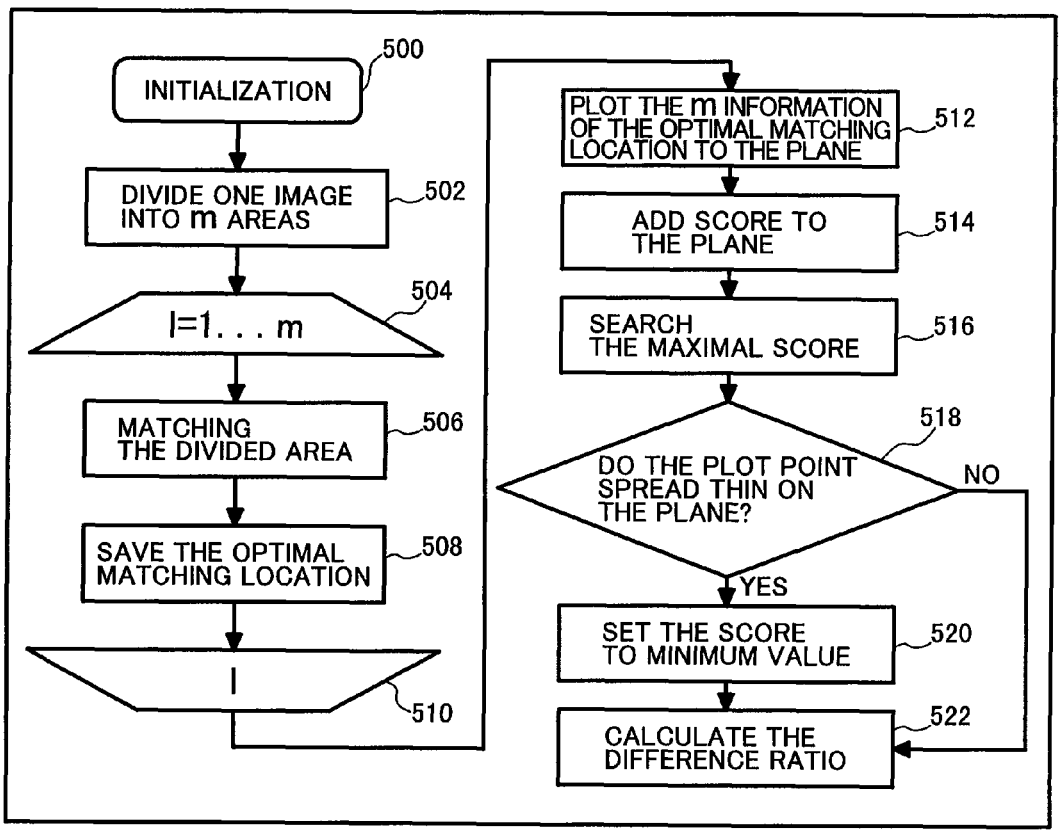
FIG. 15 is a flowchart showing how correlation between vein patterns is calculated by utilizing partial images of two vein patterns.

FIG. 15 is a flowchart showing an example of another technique to perform matching in a case where the ratio of mismatching according to the above-described matching method cannot determine whether or not the individual is the authorized person. A technique of calculating mismatches in whole images can accomplish personal identification in many cases. However, there are some ambiguous data around the threshold. Then, data around the threshold can be assessed by another matching technique, and the overall accuracy of personal identification is likely to be enhanced.

Local matching is accomplished in the following manner. One of the two compared images is divided into m (m≦2) subregions (502). In each of the subregions, matching with the other image is performed once again (506). Here, simply the number of pixels having found counterparts of respectively the same luminous intensities is counted. The location in which the greatest number of pixels are found matched is regarded as the matching location. The range of shifting is restricted in advance so that coincidental matching with an evidently impossible location may not occur. Then, locational information on the best matched subregion is acquired (508). Thus, the extent of deviation of matching in each subregion from the initial location is held in the form of a two-dimensional vector. Upon completion of matching for every subregion, information on m matching locations is plotted on a plane (512), and the degree of concentration of points is evaluated. If these points are densely concentrated, it means a close correlation between the two images or, conversely, if they are sparse, almost no correlation is conceivable. For the evaluation of the degree of concentration, a weight p is added to each plotted point, and a value smaller by Δp each is added per pixel of deviation from that point (514). Greater values emerge on the plane where plotted points are concentrated, because the weight is added repeatedly. If the matching locations are the same in all the m subregions, the maximum value of the weight that is added will be m*p. Or, conversely, if the matching locations are sparse, the maximum evaluation value will be p. Since there can be overlapping of matching locations by chance, the maximum evaluation value can be greater than p even between images without correlation between them. Scores are assigned on the plane in this way, and the greatest score is sought for (516). This score represents the correlation between the two vein patterns. If this count is high, the identification claimant is highly likely to be the authorized person or, conversely, if the count is low, the claimant is highly likely to be someone else. However, there may be a high level of correlation by reason of coincidence of matching locations by chance. Then, it is highly likely for an unauthorized person to be mistaken for the authorized. For this reason, if there are only a few plotted points within a circle of a certain radius from the location where the maximum evaluation value arises, the high evaluation value will be judged as being accidental (518), and the claimant is judged to be an unauthorized person (520). FIG. 16 shows the result of performance evaluation according to the present invention and that by another method. The latter method differs from the invention in the process from the acquisition of the finger image until the end of identification. By this method, the acquired image is uniformly filtered to emphasize the vein pattern, two-dimensional convolution calculation is applied to a registered template and the image, and the sharpness of the peak in the short axis direction of the finger is evaluated. In performance evaluation, four images of the fifth finger of each of 678 subjects were picked up, one of which was deemed to be the registered template, and finger images of the authorized person and others were collated. The collation was carried out by trying every combination of the registered template of every subject with the vein pattern of the authorized person and those of others. Also, collation was also done between a finger image which was not the registered template and the registered template of the same person.

As a result of collation, the false reject rate (FRR), i.e. the rate of mistaking the authorized person for someone else and the false accept rate (FAR), i.e. the rate of accepting an unauthorized person as the authorized, are determined. Here is used as the indicator of performance evaluation the relationship between the FRR and the FAR. The result of comparative performance evaluation in which, in collating the registered templates and other images of respectively the same persons, only one other image each was used are listed in (a). The smaller the FRR and the FAR the better, but it is seen that the FRR and the FAR according to the invention are already about 1/10 of the respective rates resulting from collation by the other method. Even better results were obtained where local matching was also carried out. The result of comparative performance evaluation in which, in collating the registered templates and other images of respectively the same persons, the image giving the best result in each case out of three other images was selected are listed in (b). While, according to this alternative method, there still are data which do not permit correct distinction between the authorized and unauthorized persons, the technique according to the invention can correctly distinguish the authorized person from others. These results endorse the significant advantages of the invention.

According to the present invention, personal identification is possible using features within the human body without requiring bodily contact with the identification device, meeting little psychological resistance from the person to be identified, and with little risk of forgery. In spite of positional deviation intrinsic to the absence of contact and the use of unclear images, personal identification is made possible with high accuracy.

While the present invention has been described above in conjunction with the preferred embodiments, one of ordinary skilled in the art would be enabled by this disclosure to make various modifications to this embodiments and still be within the scope and spirit of the invention as defined in the appended claims.

What is claimed is:

1. A personal identification apparatus comprising:
a finger inlet into which a finger inserted;
an interface where the finger is introduced through the finger inlet;
a plurality of light sources provided inside the interface to irradiate light to the finger from a plurality of directions;
image pick-up units being respectively arranged opposite to the plurality of light sources and respectively capturing an image from light transmitted from the plurality of light sources through the finger;
a unit for adjusting when the plurality of light sources transmit light onto the finger; and
a unit for extracting blood vessel patterns contained in images captured by the image pick-up units from the light transmitted though the finger and collating each of the extracted blood vessel patterns with a registered blood vessel pattern for personal identification.

2. The personal identification apparatus according to claim 1,
wherein the plurality of light sources and the image pick-up units are respectively arranged opposite to each other in a concentric from to surround the finger inserted into the finger inlet.

3. The personal identification apparatus according to claim 1, wherein each of the image pick-up units comprises at least a camera and an optical filter.

4. The personal identification apparatus according to claim 1,
wherein the extracting and collating unit is capable to be connected to an external storage device for storing the registered blood vessel pattern and personal information corresponding to the registered blood vessel pattern.

* * * * *